US011080610B2

(12) United States Patent
Iijima et al.

(10) Patent No.: US 11,080,610 B2
(45) Date of Patent: *Aug. 3, 2021

(54) NUMERICAL CONTROL SYSTEM THAT DETECTS AN ABNORMALITY IN AN OPERATION STATE

(71) Applicant: Fanuc Corporation, Yamanashi (JP)

(72) Inventors: Kazunori Iijima, Yamanashi (JP); Kazuhiro Satou, Yamanashi (JP); Yohei Kamiya, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 301 days.

This patent is subject to a terminal disclaimer.

(21) Appl. No.: 16/141,133

(22) Filed: Sep. 25, 2018

(65) Prior Publication Data
US 2019/0101891 A1 Apr. 4, 2019

(30) Foreign Application Priority Data
Sep. 29, 2017 (JP) .............................. JP2017-191864

(51) Int. Cl.
*G06N 5/04* (2006.01)
*G06N 20/00* (2019.01)
(Continued)

(52) U.S. Cl.
CPC ........... *G06N 5/04* (2013.01); *G05B 19/4063* (2013.01); *G06N 20/00* (2019.01); *G05B 19/4083* (2013.01); *G06N 5/045* (2013.01)

(58) Field of Classification Search
None
See application file for complete search history.

(56) References Cited

U.S. PATENT DOCUMENTS 9,977,425 B1* 5/2018 McCann ............ G05B 23/0283
2004/0179915 A1* 9/2004 Hill ....................... G05B 19/406
409/131
(Continued)

FOREIGN PATENT DOCUMENTS

CN 102819239 A 12/2012
CN 106022977 A 10/2016
(Continued)

OTHER PUBLICATIONS

Notice of Reasons for Refusal for Japanese Application No. 2017-191864, dated Aug. 20, 2019, with translation, 6 pages.
(Continued)

*Primary Examiner* — Kamran Afshar
*Assistant Examiner* — Benjamin J Buss
(74) *Attorney, Agent, or Firm* — RatnerPrestia

(57) ABSTRACT

A numerical control system detects a state amount indicating an operation state of a machine tool, creates a characteristic amount that characterizes the state of a machining operation from the detected state amount, infers an evaluation value of the operation state of the machine tool from the characteristic amount, and detects an abnormality in the operation state of the machine tool on the basis of the inferred evaluation value. The numerical control system generates and updates a learning model by machine learning that uses the characteristic amount, and stores the learning model in correlation with a combination of conditions of the machining operation of the machine tool.

6 Claims, 10 Drawing Sheets

(51) Int. Cl.
  *G05B 19/4063* (2006.01)
  *G05B 19/408* (2006.01)

(56) References Cited

U.S. PATENT DOCUMENTS

| | | | |
|---|---|---|---|
| 2007/0052383 A1 | 3/2007 | Abe et al. | |
| 2007/0168157 A1* | 7/2007 | Khibnik | G05B 13/04 |
| | | | 702/182 |
| 2008/0101881 A1 | 5/2008 | Hon et al. | |
| 2010/0257838 A1* | 10/2010 | Mazzaro | F01D 21/003 |
| | | | 702/184 |
| 2015/0379423 A1 | 12/2015 | Dirac et al. | |
| 2017/0091667 A1 | 3/2017 | Yukawa | |
| 2018/0356282 A1* | 12/2018 | Fukuda | G05B 19/4065 |
| 2019/0018391 A1* | 1/2019 | Rogers | G05B 19/4097 |
| 2019/0101892 A1* | 4/2019 | Satou | G05B 19/4065 |
| 2019/0152011 A1* | 5/2019 | Kummari | B23Q 17/098 |
| 2019/0179297 A1* | 6/2019 | Kuroda | G06N 20/00 |
| 2019/0210176 A1* | 7/2019 | Yamamoto | G05B 13/0265 |
| 2019/0258223 A1* | 8/2019 | Oota | G06N 20/00 |
| 2020/0014761 A1* | 1/2020 | Kawaai | G06N 20/10 |

FOREIGN PATENT DOCUMENTS

| | | |
|---|---|---|
| CN | 106560751 A | 4/2017 |
| CN | 106663224 A | 5/2017 |
| JP | 9-76144 A | 3/1997 |
| JP | 2007-72879 A | 3/2007 |
| JP | 2009-80752 A | 4/2009 |
| JP | 2017120622 A | 7/2017 |
| JP | 2008-110435 A | 5/2018 |
| WO | 2014045030 A1 | 3/2014 |
| WO | WO-2018173121 A1 * | 9/2018 ............. G06N 20/10 |

OTHER PUBLICATIONS

Chinese Office Action for Chinese Application No. 2018111383706, dated Dec. 3, 2020 with translation, 12 pages.

\* cited by examiner

NUMERICAL CONTROL SYSTEM THAT DETECTS AN ABNORMALITY IN AN OPERATION STATE

CROSS-REFERENCE TO RELATED APPLICATION

This application is a new U.S. patent application that claims benefit of Japanese Patent Application No. 2017-191864, filed Sep. 29, 2017, the disclosure of this application is being incorporated herein by reference in its entirety for all purposes.

BACKGROUND OF THE INVENTION

1. Field of the Invention

The present invention relates to a numerical control system, and particularly, to a numerical control system that switches a learning model to detect an abnormality in an operation state of a machine tool.

2. Description of the Related Art

In a machine tool (for example, a machining center, a lathe, and the like) that machines a workpiece by moving a tool in relation to the workpiece, a technique of determining that an operation state of the machine tool is in an abnormal state, for example, when a large load is applied to a motor (a spindle motor) that rotates a spindle during machining of a workpiece or a motor (a feed axis motor) that moves a tool, or when an abnormal temperature is detected, or when an impact or an abnormal sound is detected (for example, see Japanese Patent Application Laid-Open No. 2009-080752, Japanese Patent Application Laid-Open No. 2008-110435, Japanese Patent Application Laid-Open No. 2007-072879, and Japanese Patent Application Laid-Open No. 09-076144).

However, when one tries to determine an abnormality in an operation state of a machine tool on the basis of information observable from the outside during machining, the machining state information observed from the outside in the event of an abnormality in the operation state of the machine tool is different depending on a machining content (rough machining, finish machining, and the like). More specifically, the machining state information is different depending on an operation pattern of a motor including a rotation speed, a feed rate, and the like of a spindle used for machining, the type of a tool used for machining, a material of a workpiece being machined, and the like. Due to this, creation of a general-purpose machine learning device (a general-purpose learning model) which can be used for detecting an abnormality in an operation state of a machine tool so as to cope with these various situations requires many pieces of state information to be detected in various situations and is difficult.

SUMMARY OF THE INVENTION

Therefore, an object of the present invention is to provide a numerical control system capable of detecting a wider range of abnormality in an operation state of a machine tool even when an operation pattern of a motor, a workpiece, a tool, and the like used during machining of a workpiece are different.

The numerical control system of the present invention solves the above-described problems by providing a mechanism for switching a learning model to be used depending on conditions such as operation conditions including a motor operation pattern during machining, a type of a tool used for machining, a type of a workpiece to be machined, and the like.

A numerical control system of the present invention has a plurality of learning models, selects one learning model according to operation conditions, environmental conditions, and the like of a machine tool during machining from these learning models, performs machine learning based on a state amount detected during machining with respect to the selected learning model to create learning models, and detects an abnormality in an operation state of the machine tool selectively using the created learning models depending on the operation conditions, the environmental conditions, and the like of the machine tool during machining.

A numerical control system according to an aspect of the present invention is a numerical control system that detects an abnormality in an operation state of a machine tool that machines a workpiece, the numerical control system including: a condition designating unit that designates a condition of a machining operation of the machine tool; a state amount detection unit that detects a state amount indicating an operation state of the machine tool; an inference computing unit that infers an evaluation value of the operation state of the machine tool, from the state amount; an abnormality detection unit that detects an abnormality in the operation state of the machine tool on the basis of the evaluation value; a learning model generation unit that generates and updates a learning model by machine learning that uses the state amount; and a learning model storage unit that stores at least one learning model generated by the learning model generation unit in correlation with a combination of conditions designated by the condition designating unit. The inference computing unit is configured to compute the evaluation value of the operation state of the machine tool by selectively using at least one learning model among the learning models stored in the learning model storage unit on the basis of the condition of the machining operation designated by the condition designating unit.

The numerical control system may further include: a characteristic amount creation unit that creates a characteristic amount that characterizes the operation state of the machine tool, from the state amount detected by the state amount detection unit, the inference computing unit may infer the evaluation value of the operation state of the machine tool from the characteristic amount, and the learning model generation unit may generate and update the learning model by machine learning that uses the characteristic amount.

The learning model generation unit may generate a new learning model by altering an existing learning model stored in the learning model storage unit.

The learning model storage unit may encrypt and store the learning model generated by the learning model generation unit and decrypt the encrypted learning model when the learning model is read by the inference computing unit.

A numerical control system according to another aspect of the present invention is a numerical control system that detects an abnormality in an operation state of a machine tool that machines a workpiece, the numerical control system including: a condition designating unit that designates a condition of a machining operation of the machine tool; a state amount detection unit that detects a state amount indicating an operation state of the machine tool; an inference computing unit that infers an evaluation value of the operation state of the machine tool, from the state amount;

an abnormality detection unit that detects an abnormality in the operation state of the machine tool on the basis of the evaluation value; and a learning model storage unit that stores at least one learning model which is correlated in advance with a combination of conditions of the machining operation of the machine tool. The inference computing unit is configured to compute the evaluation value of the operation state of the machine tool by selectively using at least one learning model among the learning models stored in the learning model storage unit, on the basis of the condition of the machining operation designated by the condition designating unit.

The numerical control system may further include: a characteristic amount creation unit that creates a characteristic amount that characterizes the operation state of the machine tool, from the state amount, and the inference computing unit may infer the evaluation value of the operation state of the machine tool from the characteristic amount.

A numerical controller according to an aspect of the present invention includes the condition designating unit and the state amount detection unit.

A method for detecting an abnormality in an operation state according to an aspect of the present invention includes the steps of: designating a condition of a machining operation of a machine tool that machines a workpiece; detecting a state amount indicating an operation state of the machine tool; inferring an evaluation value of the operation state of the machine tool from the state amount; detecting an abnormality in the operation state of the machine tool on the basis of the evaluation value; and generating and updating a learning model by machine learning that uses the state amount. In the inferring step, a learning model to be used is selected, on the basis of the condition of the machining operation designated in the step of designating the condition, among at least one learning model correlated in advance with a combination of conditions of the machining operation of the machine tool, and the evaluation value of the operation state of the machine tool is computed using the selected learning model.

The method may further include: the step of creating a characteristic amount that characterizes the operation state of the machine tool, from the state amount. In the inferring step, the evaluation value of the operation state of the machine tool may be inferred from the characteristic amount, and in the step of generating and updating the learning model, the learning model may be generated and updated by machine learning that uses the characteristic amount.

A method for detecting an abnormality in an operation state according to another aspect of the present invention includes the steps of: designating a condition of a machining operation of a machine tool that machines a workpiece; detecting a state amount indicating an operation state of the machine tool; inferring an evaluation value of the operation state of the machine tool from the state amount; and detecting an abnormality in the operation state of the machine tool on the basis of the evaluation value. In the inferring step, a learning model to be used is selected, on the basis of the condition of the machining operation designated in the step of designating the condition, among at least one learning model correlated in advance with a combination of conditions of the machining operation of the machine tool, and the evaluation value of the operation state of the machine tool is computed using the selected learning model.

The method may further include: the step of creating a characteristic amount that characterizes the operation state of the machine tool, from the state amount, and in the inferring step, the evaluation value of the operation state of the machine tool may be inferred from the characteristic amount.

A learning model set according to an aspect of the present invention is a learning model set in which each of a plurality of learning models is correlated with a combination of conditions of a machining operation of a machine tool, each of the plurality of learning models is generated and updated on the basis of a state amount indicating an operation state of the machine tool performed under the condition of the machining operation of the machine tool, and one learning model is selected, on the basis of the condition set to the machine tool, among the plurality of learning models, and the selected learning model is used for a process of inferring an evaluation value of the operation state of the machine tool.

According to the present invention, machine learning can be performed with respect to the learning model selected depending on the operation conditions and the environmental conditions of the machine tool during machining on the basis of the state amount detected in the respective conditions. Therefore, it is possible to perform machine learning efficiently while avoiding over-learning. Moreover, a learning model selected depending on the operation conditions, the environmental conditions, and the like of the machine tool during machining is used for detecting an abnormality in the operation state of the machine tool. Therefore, the accuracy of detection of an abnormality in the operation state of the machine tool is improved.

DETAILED DESCRIPTION OF THE PREFERRED EMBODIMENTS

Figure 1:
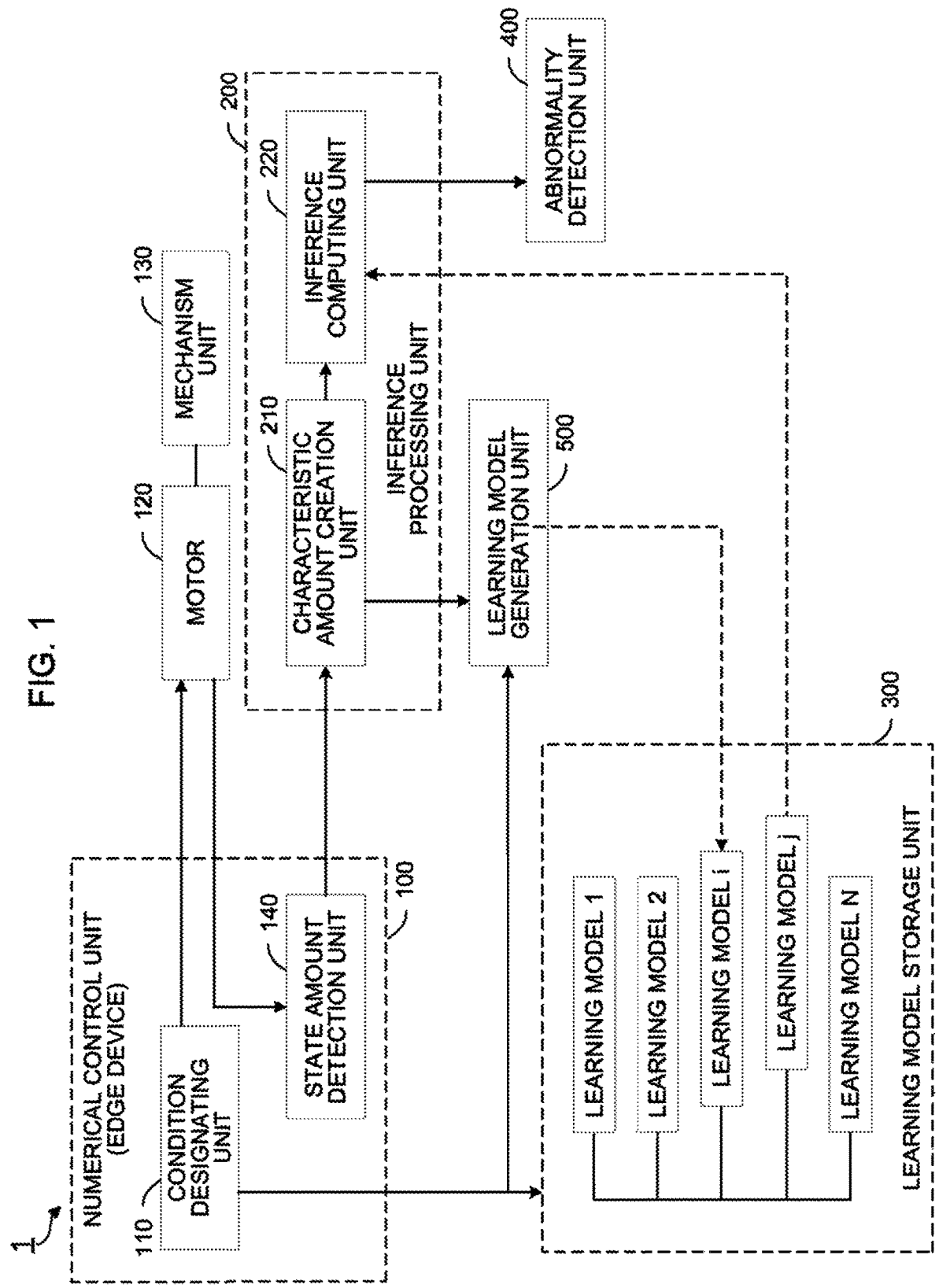
FIG. 1 is a schematic functional block diagram of a numerical control system according to a first embodiment of the present invention.

FIG. 1 is a schematic functional block diagram of a numerical control system 1 of the first embodiment.

The respective functional blocks illustrated in FIG. 1 are implemented when a numerical controller that forms the numerical control system 1 or a processor such as a CPU or a GPU included in a computer such as a cell computer, a host computer, or a cloud server controls operations of respective units of a device according to respective system programs.

The numerical control system 1 of the present embodiment includes at least a numerical control unit 100 serving as an edge device which is a state observation and inference target, an inference processing unit 200 that performs inference about the state of the edge device, and a learning model storage unit 300 that stores and manages a plurality of learning models. This numerical control system 1 further includes an abnormality detection unit 400 that detects an abnormality in an operation state of a machine tool on the basis of the result of inference by the inference processing unit 200 about the state of the edge device and a learning model generation unit 500 that creates and updates the learning model to be stored in the learning model storage unit 300.

The numerical control unit 100 of the present embodiment controls a machine tool that machines a workpiece by executing machining program blocks stored in a memory (not illustrated). The numerical control unit 100 is implemented as a numerical controller, for example, and is configured to sequentially read and analyze the machining program blocks stored in a memory (not illustrated), calculate a moving amount of a motor 120 in respective control periods on the basis of the analysis result, and controls the motor 120 according to the moving amount calculated in each control period. The machine tool controlled by the numerical control unit 100 includes a mechanism unit 130 driven by the motor 120. When the mechanism unit 130 is driven, a tool and a workpiece are moved in relation to each other and the workpiece is machined. Although not illustrated in FIG. 1, a number of motors 120 corresponding to the number of axes included in the mechanism unit 130 of the machine tool are provided. The mechanism unit 130 includes a ball screw used as a feed axis and a mechanism used as a spindle, for example. A single mechanism unit may sometimes be driven by a plurality of motors.

A condition designating unit 110 included in the numerical control unit 100 designates conditions (machining conditions, operation conditions, environmental conditions, and the like) of a machining operation executed by the numerical control unit 100 (and the machine tool controlled by the numerical control unit 100). The conditions set for the machining operation include, for example, a motor operation pattern (a spindle rotation speed, a feed rate, and the like) during machining, a type of a tool used for machining, and workpiece information indicating the hardness, the material, and the like of a workpiece serving as a machining target. The condition designating unit 110 designates (outputs), to respective units of the numerical control unit 100 as necessary, conditions instructed by a machining program, conditions set to the numerical control unit 100 via an input device (not illustrated) by an operator, conditions set to the numerical control unit 100 by another computer connected via a network or the like, or conditions detected by a device such as a sensor provided separately in the numerical control unit 100 and also designates (outputs) these conditions to the learning model storage unit 300 and the learning model generation unit 500. The condition designating unit 110 has a role of informing the respective units of the numerical control system 1 of the conditions of the present machining operation of the numerical control unit 100 as the edge device as conditions for selecting a learning model.

A state amount detection unit 140 included in the numerical control unit 100 detects the state of a machining operation by the numerical control unit 100 (and the machine tool controlled by the numerical control unit 100) as a state amount. The detected state amount of the machining operation includes, for example, a load (a current value) of a spindle, a load (a current value) of a feed axis, a spindle rotation speed, a feed axis speed, a feed axis position, a temperature of the motor 120, a vibration value, and a sound. The state amount detection unit 140 detects, for example, a current value flowing through the motor 120 that drives the numerical control unit 100 or the mechanism unit 130 of the machine tool controlled by the numerical control unit 100 and a detection value detected by a device such as a sensor provided separately in respective units as the state amount. The state amount detected by the state amount detection unit 140 is output to the inference processing unit 200 and the learning model generation unit 500.

The inference processing unit 200 observes the state of the numerical control unit 100 (and the machine tool controlled by the numerical control unit 100) as an edge device and infers the state (a machining state) of the numerical control unit 100 based on the observation result. The inference processing unit 200 may be implemented, for example, as a numerical controller, a cell computer, a host computer, a cloud server, or a machine learning device.

A characteristic amount creation unit 210 included in the inference processing unit 200 creates a characteristic amount indicating a characteristic of an operation state of the machine tool controlled by the numerical control unit 100 on the basis of the state amount detected by the state amount detection unit 140. The characteristic amount indicating the characteristics of the operation state of the machine tool created by the characteristic amount creation unit 210 is useful information as information for determination when detecting an abnormality in the operation state of the machine tool in a machining operation executed by the numerical control unit 100 (and the machine tool controlled by the numerical control unit 100). Moreover, the characteristic amount indicating the characteristic of the operation state of the machine tool created by the characteristic amount creation unit 210 serves as input data when an inference computing unit 220 to be described later performs inference using a learning model. The characteristic amount indicating the characteristic of the operation state of the machine tool created by the characteristic amount creation unit 210 may be an amount obtained by sampling the load of the spindle detected by the state amount detection unit 140, for example, in a predetermined sampling period for a predetermined past period and may be a peak value in a predetermined past period of the vibration value of the motor 120 detected by the state amount detection unit 140. For example, the characteristic amount may be obtained by a combination of signal processes of integral-transforming the state amounts detected by the state amount detection unit 140 onto a time-series frequency region, normalizing the amplitudes or power densities of the state amounts, fitting the same to a transfer function, and reducing the dimension to a specific time or frequency width. The characteristic amount creation unit 210 performs pre-processing to normalize the state amount detected by the state amount detection unit 140 so that the inference computing unit 220 can deal with the state amount.

The inference computing unit 220 included in the inference processing unit 200 infers an evaluation value of the operation state of the machine tool executed by the numerical control unit 100 (and the machine tool controlled by the numerical control unit 100) on the basis of one learning model selected, on the basis of the conditions of the present operation state of the machine tool, from a plurality of learning models stored in the learning model storage unit 300 and the characteristic amount created by the characteristic amount creation unit 210. The inference computing unit 220 is implemented by applying a learning model stored in the learning model storage unit 300 to a platform capable of executing an inference process based on machine learning. The inference computing unit 220 may be one for performing an inference process using a multilayer neural network, for example, and may be one for performing an inference process using a known learning algorithm as machine learning such as a Bayesian network, a support vector machine, or a mixture Gaussian model. The inference computing unit 220 may be one for performing an inference process using a learning algorithm such as, for example, supervised learning, unsupervised learning, or reinforcement learning. Moreover, the inference computing unit 220 may be able to execute inference processes based on a plurality of types of learning algorithms. The inference computing unit 220 forms a machine learning device based on one learning model selected from a plurality of learning models stored in the machine learning model storage unit 300 and executes an inference process using the characteristic amount created by the characteristic amount creation unit 210 as input data of the machine learning device to thereby infer an evaluation value of the operation state of the machine tool executed by the numerical control unit 100 (and the machine tool controlled by the numerical control unit 100). The evaluation value as the result inferred by the inference computing unit 220 may be information indicating a classification of normal/abnormal of the operation state of the machine tool and a location (a bearing abnormality of the motor 120, a breakage of a connecting portion between the motor 120 and the mechanism unit 130, and the like) of abnormality of the operation state of the machine tool, and the distance between the present operation state of the machine tool and a distribution of the operation states of the machine tool in a normal state.

The learning model storage unit 300 of the present embodiment can store a plurality of learning models correlated with a combination of conditions of the machining operation designated by the condition designating unit 110. The learning model storage unit 300 may be implemented, for example, as a numerical controller, a cell computer, a host computer, a cloud server, or a database server.

A plurality of learning models 1, 2, . . . , and N correlated with combinations of conditions (machining conditions, operation conditions, environmental conditions, and the like) designated by the condition designating unit 110 are stored in the learning model storage unit 300. The combinations of the conditions (machining conditions, operation conditions, environmental conditions, and the like) of the machining operation mentioned herein mean combinations related to values that each condition can take, the range of values, and the list of values. For example, when the combinations of conditions are combinations of a spindle rotation speed, a feed rate, a tool type, and workpiece information, "spindle rotation speed: 500 to 100 [min$^{-1}$], feed rate: 200 to 300 [mm/min], a drill tool, and aluminum/steel" can be used as one of the combinations of conditions of the machining operation.

The learning model stored in the learning model storage unit 300 is stored as information that can form one learning model suitable for the inference process of the inference computing unit 220. When the learning model stored in the learning model storage unit 300 is a learning model which uses a learning algorithm of a multilayer neural network, for example, the learning model may be stored as the number of neurons (perceptrons) of each layer, a weight parameter between neurons (perceptrons) of each layer, and the like. Moreover, when the learning model stored in the learning model storage unit 300 is a learning model which uses a learning algorithm of a Bayesian network, the learning model may be stored as nodes that form the Bayesian network, a transition probability between nodes, and the like. The learning models stored in the learning model storage unit 300 may be learning models which use the same learning algorithm and learning models which use different learning algorithms, and may be learning models which use an arbitrary learning algorithm which can be used for the inference process of the inference computing unit 220.

The learning model storage unit 300 may store one learning model in correlation with combinations of conditions of one machining operation and may store learning models which use two or more different learning algorithms in correlation with combinations of conditions of one machining operation. The learning model storage unit 300 may store a learning model which use different learning algorithms in correlation with each of combinations of conditions of a plurality of machining operations of which the ranges of combinations overlap. In this case, the learning model storage unit 300 may further determine a use condition such as a necessary processing ability and the type of a learning algorithm with respect to a learning model corresponding to a combination of conditions of a machining operation. In this way, it is possible to select learning models corresponding to the inference computing units 220 of which the inference processes and the processing abilities are different with respect to a combination of conditions of the machining operation, for example.

Upon receiving, from the outside, a request for reading/writing a learning model including a combination of conditions of the machining operation, the learning model storage unit 300 reads and writes the learning model stored in correlation with the combination of conditions of the machining operation. In this case, the learning model read/write request may include information on a processing ability and an inference process executable by the inference computing unit 220. In this case, the learning model storage unit 300 reads and writes a learning model correlated with the combination of conditions of the machining operation and the processing ability and the inference process executable by the inference computing unit 220. The learning model storage unit 300 may have a function of reading and writing a learning model correlated with conditions (and the combination thereof) designated from the condition designating unit 110 with respect to the learning model read/write request from the outside on the basis of the condition designated from the condition designating unit 110. By providing such a function, it is not necessary to provide a function of requesting a learning model based on the condition designated from the condition designating unit 110 to the inference computing unit 220 and the learning model generation unit 500.

The learning model storage unit 300 may encrypt and record the learning model generated by the learning model generation unit 500 and decrypt the encrypted learning model when the learning model is read by the inference computing unit 220.

The abnormality detection unit 400 detects an abnormality occurring in the numerical control unit 100 (and the machine tool controlled by the numerical control unit 100)

on the basis of the evaluation value of the operation state of the machine tool inferred by the inference processing unit 200. The abnormality detection unit 400 detects whether the operation state of the machine tool corresponding to the content of the evaluation value as the inference result output by the inference computing unit 220 is normal/abnormal. For example, the abnormality detection unit 400 may detect that the operation state of the machine tool is abnormal when the present operation state of the machine tool inferred by the inference processing unit 200 is classified to abnormal and may detect that the operation state of the machine tool is normal in other cases. The abnormality detection unit 400 may detect that the operation state of the machine tool is abnormal when a distance between the present operation state of the machine tool and a distribution of the operation state of the machine tool in a normal state exceeds a predetermined threshold and may detect that the operation state of the machine tool is normal in other cases.

Upon detecting that the operation state of the machine tool is abnormal, the abnormality detection unit 400 may notify an operator of an abnormality in the operation state of the machine tool with the aid of a display device, a lamp, an audio output device, or the like which is not illustrated. Moreover, upon detecting that the operation state of the machine tool is abnormal, the abnormality detection unit 400 may instruct the numerical control unit 100 to stop machining.

The learning model generation unit 500 generates and updates (performs machine learning on) the learning model stored in the learning model storage unit 300 on the basis of the conditions of the machining operation designated by the condition designating unit 110 and the characteristic amount indicating the characteristics of the operation state of the machine tool created by the characteristic amount creation unit 210. The learning model generation unit 500 selects a learning model serving as a generation and updating target on the basis of the conditions of the machining operation designated by the condition designating unit 110 and performs machine learning based on the characteristic amount indicating the characteristics of the operation state of the machining operation created by the characteristic amount creation unit 210 with respect to the selected learning model. When a learning model correlated with (the combination of) the conditions of the machining operation designated by the condition designating unit 110 is not stored in the learning model storage unit 300, the learning model generation unit 500 generates a new learning model correlated with (the combination of) the conditions, whereas when a learning model correlated with (the combination of) the conditions of the machining operation designated by the condition designating unit 110 is stored in the learning model storage unit 300, the learning model generation unit 500 updates the learning model by performing machine learning on the learning model. When a plurality of learning models correlated with (the combination of) the conditions of the machining operation designated by the condition designating unit 110 are stored in the learning model storage unit 300, the learning model generation unit 500 may perform machine learning with respect to the respective learning models and may perform machine learning with respect to some learning models on the basis of the processing ability and the learning process executable by the learning model generation unit 500.

The learning model generation unit 500 may apply an alteration to the learning model stored in the learning model storage unit 300 to generate a new learning model. As an example of alteration of the learning model by the learning model generation unit 500, generation of a distillation model may be considered. A distillation model is a learnt model obtained by performing learning in another machine learning device from the beginning using an output obtained by inputting information to a machine learning device in which a learnt model is incorporated. The learning model generation unit 500 may store a distillation model obtained through such a step (referred to as a distillation step) in the learning model storage unit 300 as a new learning model and use the distillation model. In general, since a distillation model has a smaller size than an original learnt model and provide accuracy equivalent to the original learnt model, the distillation model is suitable for distribution to another computer via a network or the like. As another example of alteration of the learning model by the learning model generation unit 500, integration of learning models may be considered. When the structures of two or more learning models stored in correlation with (the combination of) the conditions of the machining operation are similar to each other, for example, when the values of respective weight parameters are within a predetermined threshold, the learning model generation unit 500 may integrate (the combination of) the conditions of the machining operation correlated with the learning models and may store any one of the two or more learning models having similar structures in correlation with the integrated condition.

Figure 2:
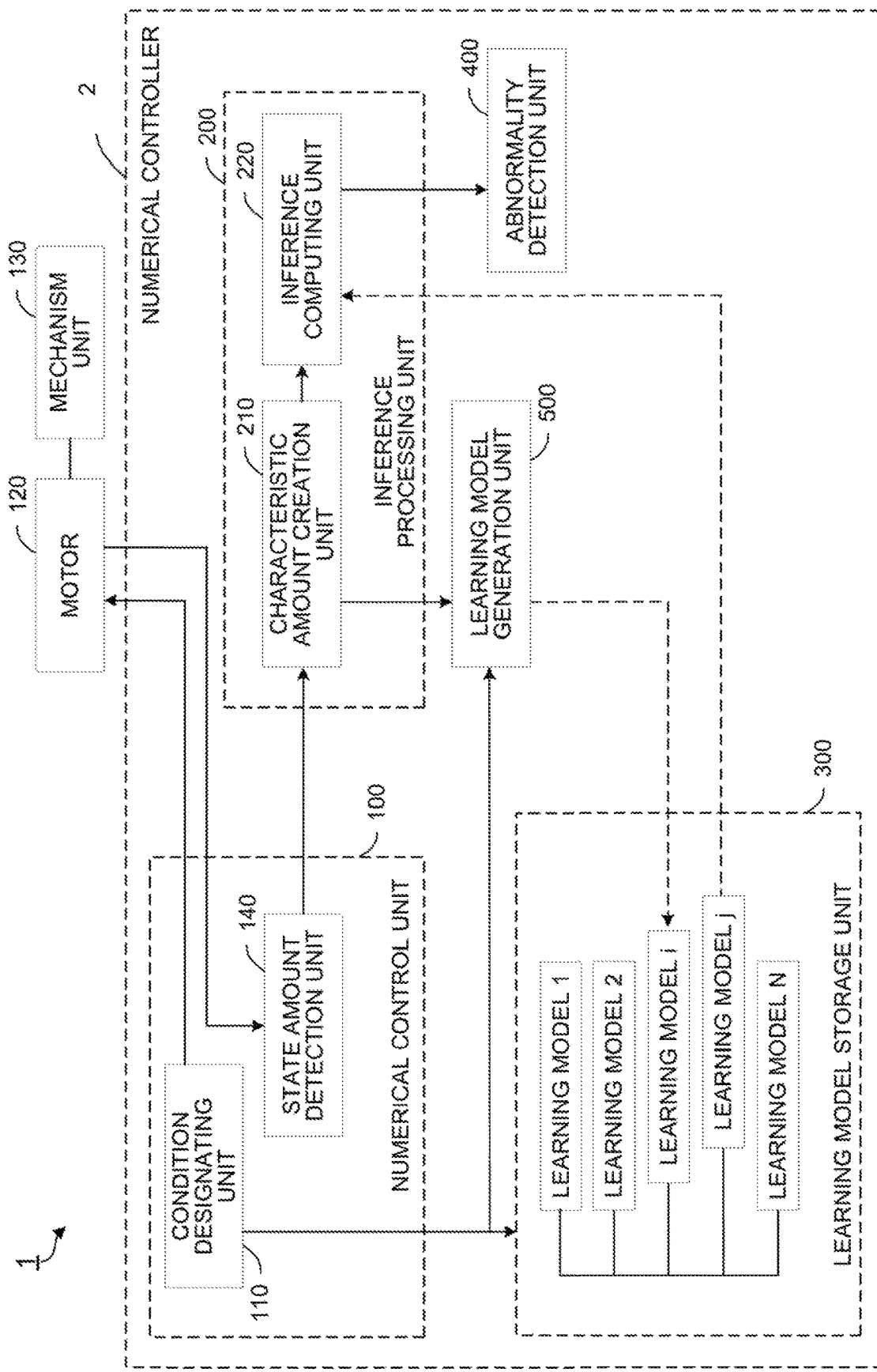
FIG. 2 is a schematic functional block diagram of a numerical control system according to a second embodiment of the present invention.

FIG. 2 is a schematic functional block diagram of the numerical control system 1 according to a second embodiment.

In the numerical control system 1 of the present embodiment, respective functional blocks are implemented on one numerical controller 2. With this configuration, the numerical control system 1 of the present embodiment can infer the operation state of the machine tool using different learning models depending on conditions such as an operation pattern of the motor 120 in the machining operation of the machine tool controlled by the numerical controller 2, and the type of a tool used for machining, a material of the workpiece, and can detect an abnormality in the operation state of the machine tool. Moreover, it is possible to generate and update respective learning models corresponding to the conditions of the machining operation using one numerical controller 2.

Figure 3:
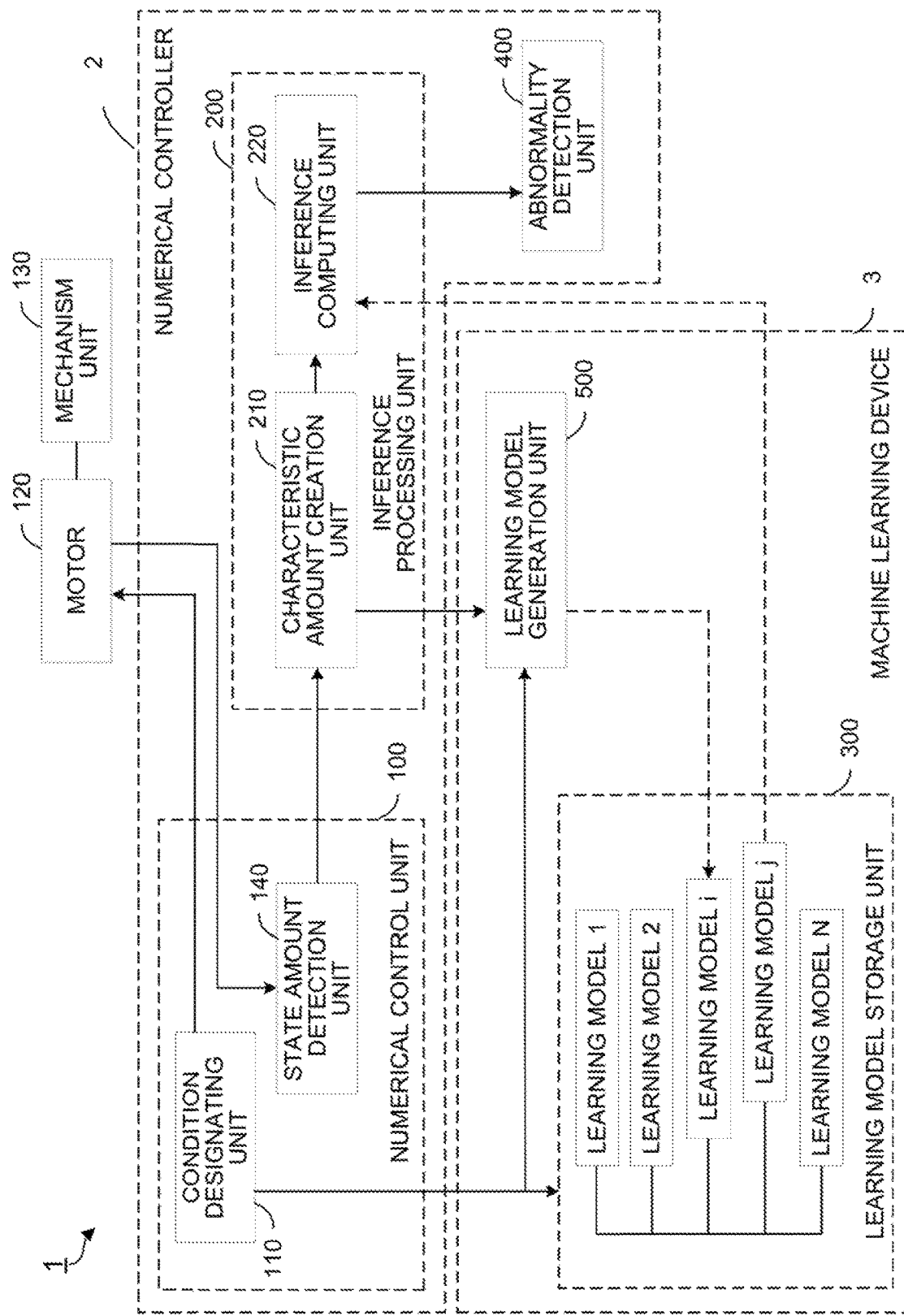
FIG. 3 is a schematic functional block diagram of a numerical control system according to a third embodiment of the present invention.

FIG. 3 is a schematic functional block diagram of the numerical control system 1 according to a third embodiment.

In the numerical control system 1 of the present embodiment, the numerical control unit 100, the inference processing unit 200, and the abnormality detection unit 400 are implemented on the numerical controller 2, and the learning model storage unit 300 and the learning model generation unit 500 are implemented on the machine learning device 3 connected to the numerical controller 2 via a standard interface or a network. The machine learning device 3 may be implemented on a cell computer, a host computer, a cloud server, a database server, or the like. With this configuration, an inference process using a learnt model, which is a relatively light process, can be executed on the numerical controller 2, and a process of generating and updating a learning model, which is a relatively heavy process, can be executed on the machine learning device 3. Therefore, it is possible to operate the numerical control system 1 without interrupting a machine tool control process executed by the numerical controller 2.

Figure 4:
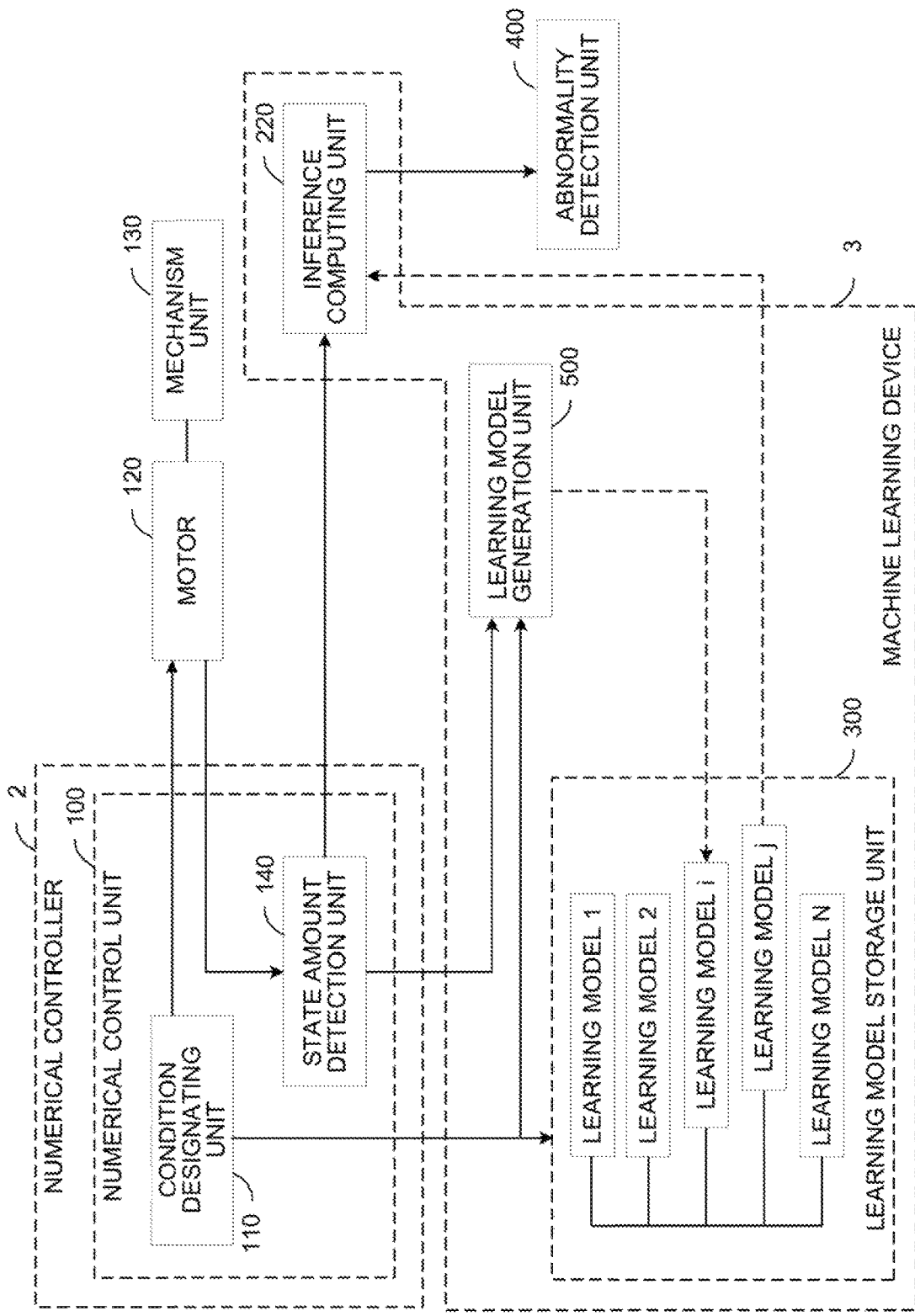
FIG. 4 is a schematic functional block diagram of a numerical control system according to a fourth embodiment of the present invention.

FIG. 4 is a schematic functional block diagram of the numerical control system 1 according to a fourth embodiment.

In the numerical control system 1 of the present embodiment, the numerical control unit 100 is implemented on the numerical controller 2, and the inference computing unit 220, the learning model storage unit 300, and the learning model generation unit 500 are implemented on the machine learning device 3 connected to the numerical controller 2 via a standard interface or a network. Moreover, the abnormality detection unit 400 is provided separately. In the numerical control system 1 of the present embodiment, it is assumed that the state amount detected by the state amount detection unit 140 is data which can be used for the inference process of the inference computing unit 220 and the learning model generation and updating process of the learning model generation unit 500 as it is, and the configuration of the characteristic amount creation unit 210 is omitted. With this configuration, the inference process which uses a learnt model and the learning model generation and updating process can be executed on the machine learning device 3. Therefore, it is possible to operate the numerical control system 1 without interrupting the machine tool control process executed by the numerical controller 2.

Figure 5:
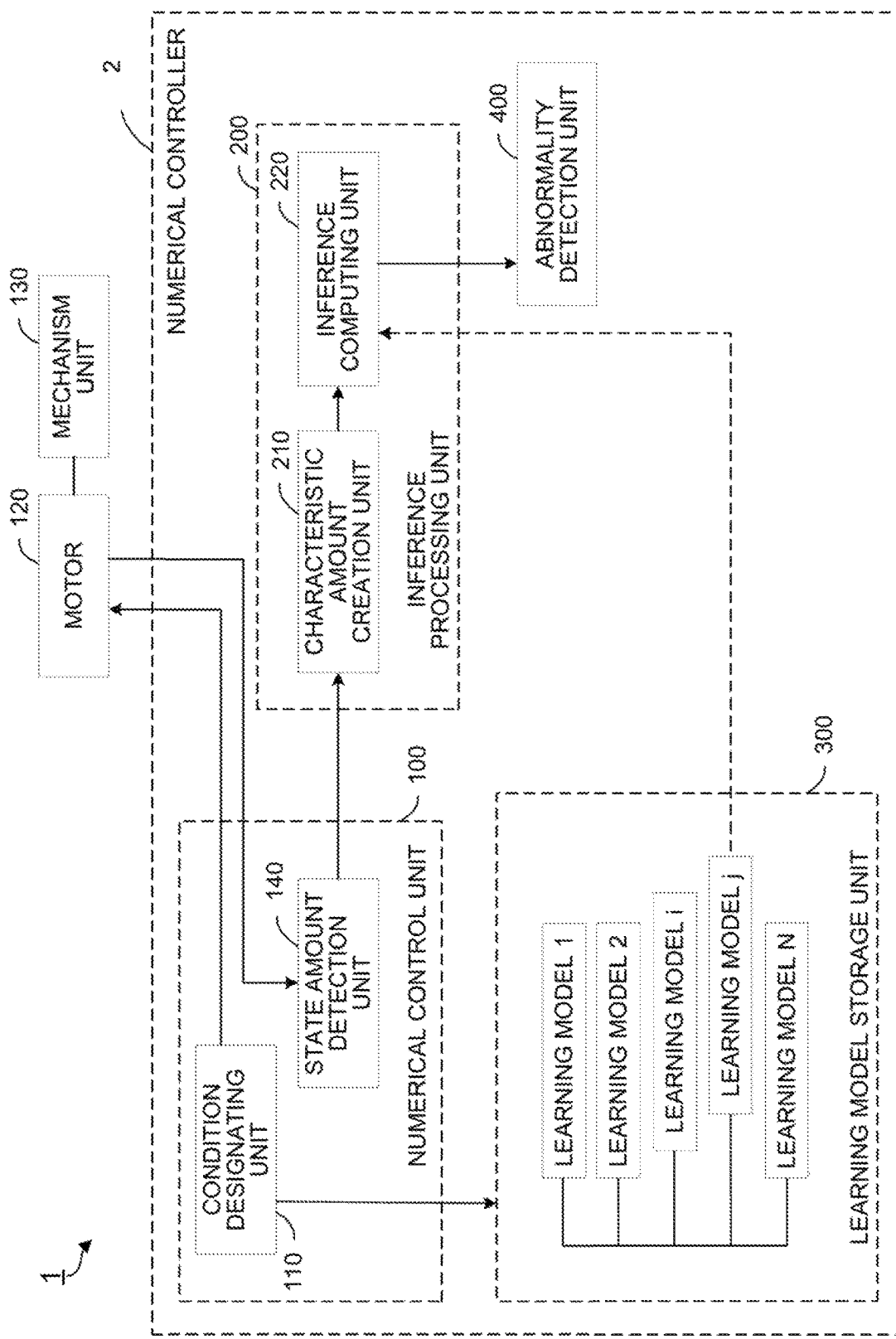
FIG. 5 is a schematic functional block diagram of a numerical control system according to a fifth embodiment of the present invention.

FIG. 5 is a schematic functional block diagram of the numerical control system 1 according to a fifth embodiment.

In the numerical control system 1 of the present embodiment, the respective functional blocks are implemented on one numerical controller 2. In the numerical control system 1 of the present embodiment, it is assumed that a plurality of learnt models correlated with the combination of the conditions of the machining operation are stored in advance in the learning model storage unit 300, and the process of generating and updating the learning model is not performed, and the configuration of the learning model generation unit 500 is omitted. With this configuration, the numerical control system 1 of the present embodiment can infer the operation state of the machine tool using different learning models depending on the conditions such as the type of a tool attached to the machine tool controlled by the numerical controller 2 and the material of a workpiece, for example, and can detect an abnormality in the operation state of the machine tool. Moreover, since updating of learning models is not performed arbitrarily, the present embodiment can be employed as a configuration of the numerical controller 2 presented to customers, for example.

Figure 6:
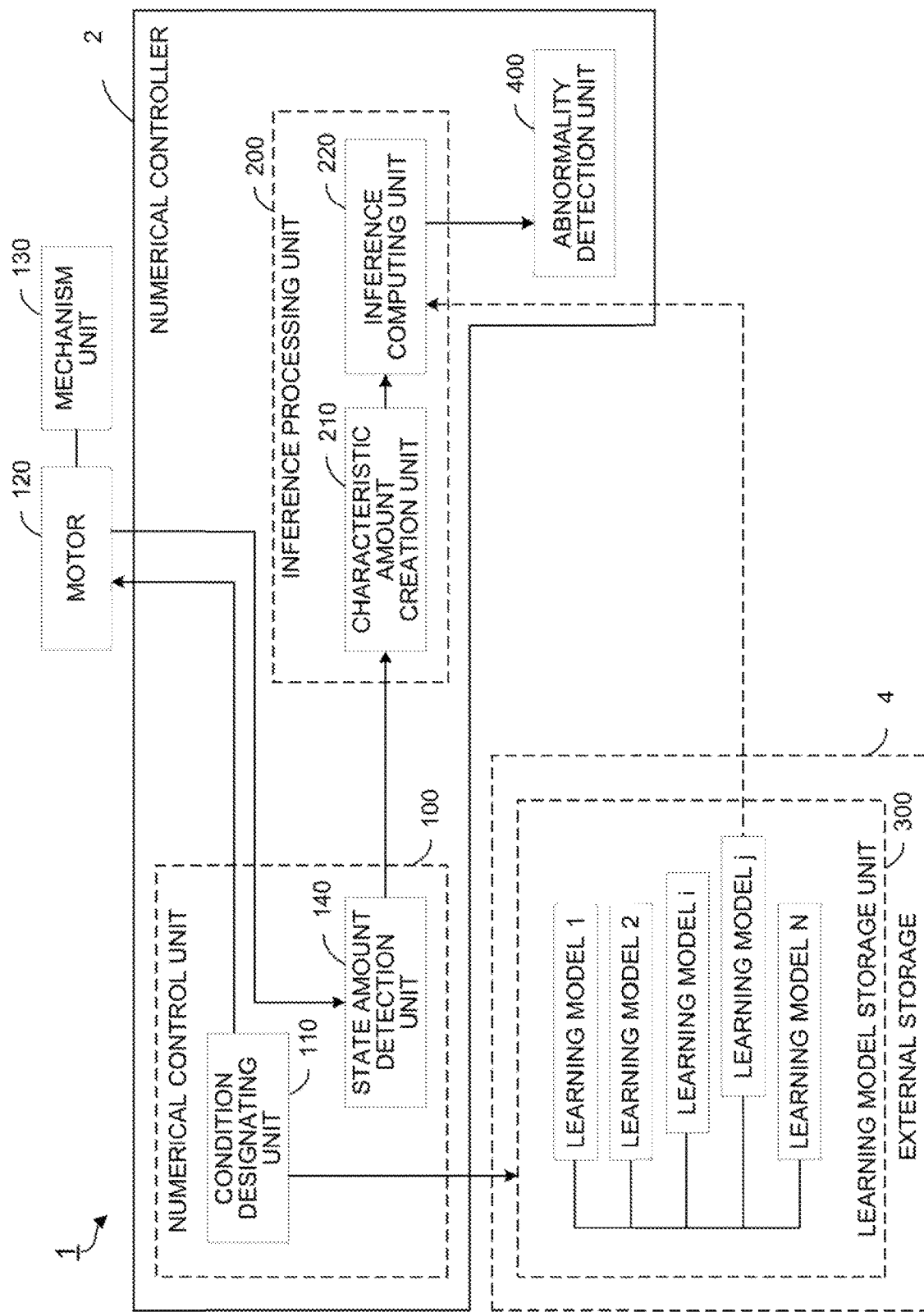
FIG. 6 is a schematic functional block diagram illustrating a modification of the numerical control system according to the fifth embodiment of the present invention.

FIG. 6 is a schematic functional block diagram illustrating a modification of the numerical control system 1 according to the fifth embodiment.

In the numerical control system 1 of this modification, the learning model storage unit 300 is not implemented on the numerical controller 2 but is implemented on an external storage 4 connected to the numerical controller 2. In this modification, since a large-volume learning model is stored in the external storage 4, it is possible to use a large number of learning models and to read learning models without via a network or the like. Therefore, the numerical control system 1 of this modification is useful when a real-time inference process is required.

Figure 7:
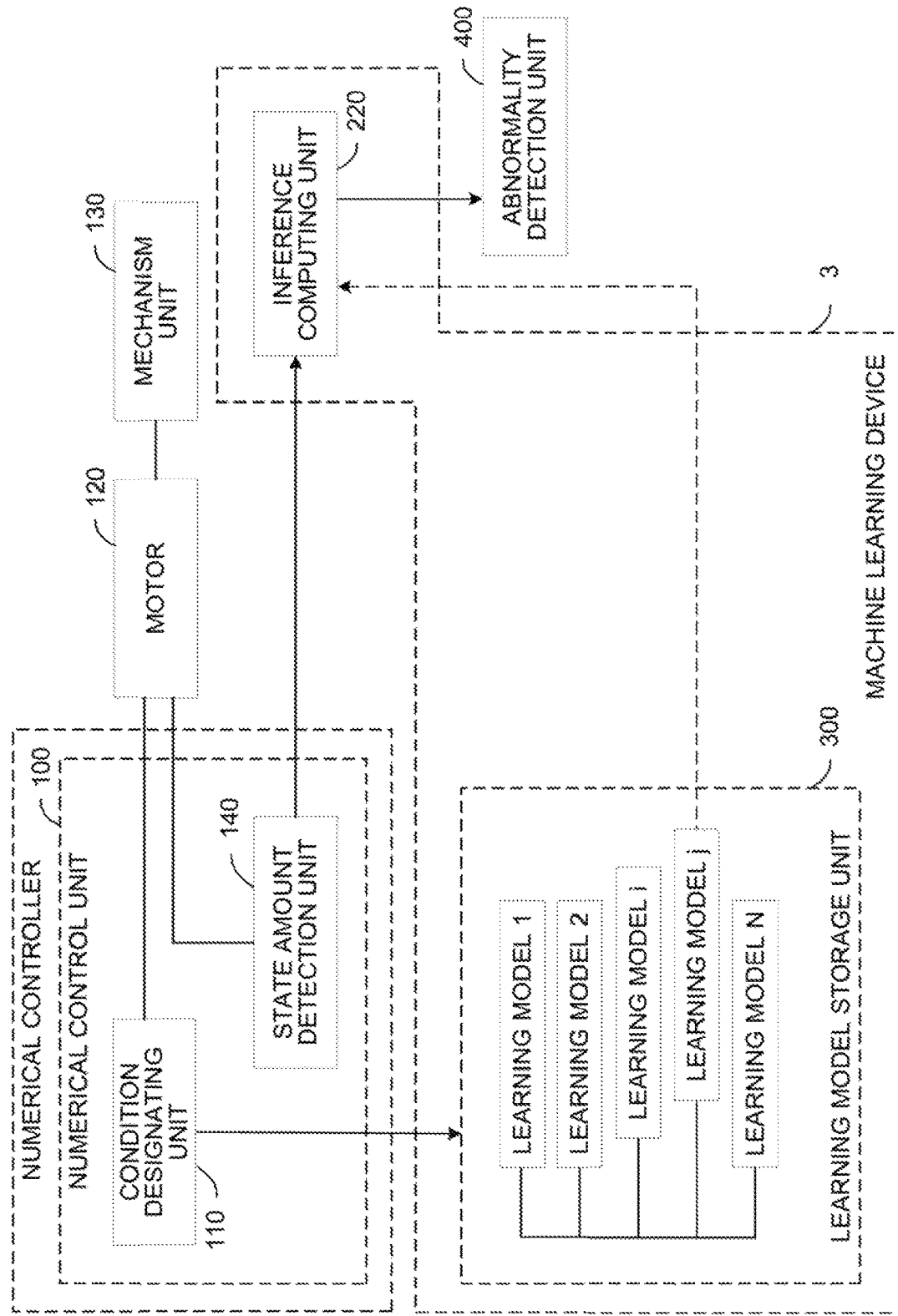
FIG. 7 is a schematic functional block diagram of a numerical control system according to a sixth embodiment of the present invention.

FIG. 7 is a schematic functional block diagram of the numerical control system 1 according to a sixth embodiment.

In the numerical control system 1 of the present embodiment, the numerical control unit 100 is implemented on the numerical controller 2, and the inference computing unit 220 and the learning model storage unit 300 are implemented on the machine learning device 3 connected to the numerical controller 2 via a standard interface or a network. The machine learning device 3 may be implemented on a cell computer, a host computer, a cloud server, or a database server. In the numerical control system 1 of the present embodiment, it is assumed that a plurality of learnt models correlated with the combination of the conditions of the machining operation are stored in advance in the learning model storage unit 300, and the process of generating and updating the learning model is not performed, and the configuration of the learning model generation unit 500 is omitted. Moreover, in the numerical control system 1 of the present embodiment, it is assumed that the state amount detected by the state amount detection unit 140 is data which can be used for the inference process of the inference computing unit 220 as it is, and the configuration of the characteristic amount creation unit 210 is omitted. With this configuration, the numerical control system 1 of the present embodiment can infer the operation state of the machine tool using different learning models depending on conditions such as an operation pattern of the motor 120 in the machining operation of the machine tool controlled by the numerical controller 2, and the type of a tool used for machining, a material of the workpiece, and can detect an abnormality in the operation state of the machine tool. Moreover, since updating of learning models is not performed arbitrarily, the present embodiment can be employed as a configuration of the numerical controller 2 presented to customers, for example.

Figure 8:
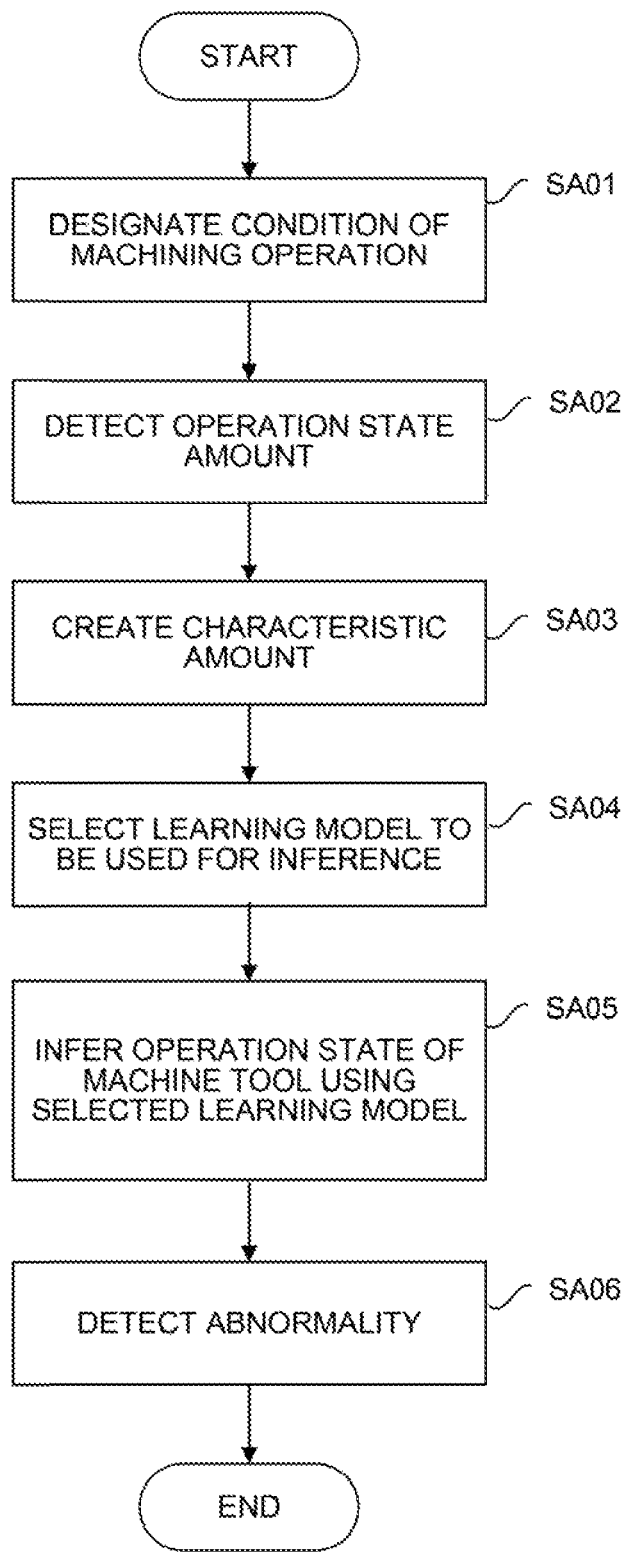
FIG. 8 is a schematic flowchart of processes executed on the numerical control system illustrated in any one of FIGS. 5 to 7.

FIG. 8 is a schematic flowchart of processes executed by the numerical control system 1 of the present invention. The flowchart illustrated in FIG. 8 illustrates the flow of processes in a case where the numerical control system 1 does not update a learning model (the fifth and sixth embodiments).

[Step SA01] The condition designating unit 110 designates conditions of the machining operation of the numerical control unit 100 (and the machine tool controlled by the numerical control unit 100).

[Step SA02] The state amount detection unit 140 detects the operation state of the machine tool by the numerical control unit 100 (and the machine tool controlled by the numerical control unit 100) as the state amount.

[Step SA03] The characteristic amount creation unit 210 creates the characteristic amount indicating the characteristics of the operation state of the machine tool on the basis of the state amount detected in step SA02.

[Step SA04] The inference computing unit 220 selects a learning model corresponding to the condition of the machining operation designated in step SA01 among a plurality of learning models stored in the learning model storage unit 300 as a learning model used for inference and reads the selected learning model.

[Step SA05] The inference computing unit 220 infers the evaluation value of the operation state of the machine tool on the basis of the learning model read in step SA04 and the characteristic amount created in step SA03.

[Step SA06] The abnormality detection unit 400 detects an abnormality in the operation state of the machine tool on the basis of the evaluation value inferred in step SA05.

Figure 9:
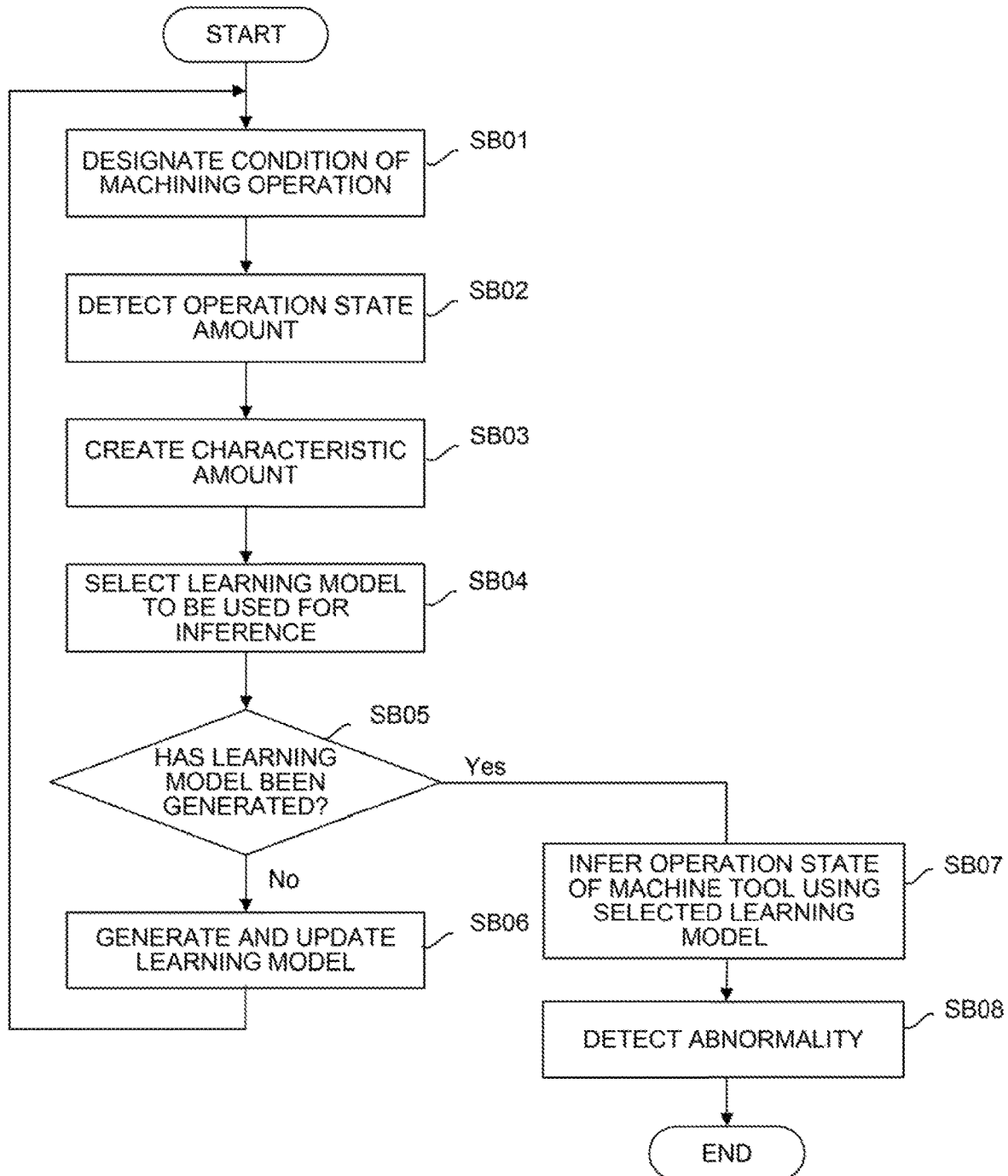
FIG. 9 is a schematic flowchart of processes executed on the numerical control system illustrated in any one of FIGS. 1 to 4.

FIG. 9 is a schematic flowchart of the processes executed by the numerical control system 1 of the present invention. The flowchart illustrated in FIG. 9 illustrates the flow of processes in a case where the numerical control system 1 generates and updates learning models (the first to fourth embodiments).

[Step SB01] The condition designating unit 110 designates the conditions of the machining operation by the numerical control unit 100 (and the machine tool controlled by the numerical control unit 100).

[Step SB02] The state amount detection unit 140 detects the operation state of the machine tool by the numerical control unit 100 (and the machine tool controlled by the numerical control unit 100) as a state amount.

[Step SB03] The characteristic amount creation unit 210 creates a characteristic amount indicating the characteristics of the operation state of the machine tool on the basis of the state amount detected in step SB02.

[Step SB04] The inference computing unit 220 selects a learning model corresponding to the condition of the machining operation designated in step SB01 among a plurality of learning models stored in the learning model storage unit 300 as a learning model used for inference and reads the selected learning model.

[Step SB05] The learning model generation unit 500 determines whether a learnt model corresponding to the conditions of the machining operation designated in step SB01 has been generated in the learning model storage unit 300. When the learnt model has already been generated, the flow proceeds to step SB07. When the learnt model has not been generated, the flow proceeds to step SB06.

[Step SB06] The learning model generation unit 500 generates and updates a learning model corresponding to the conditions of the machining operation designated in step SB01 on the basis of the characteristic amount created in step SB03, and the flow proceeds to step SB01.

[Step SB07] The inference computing unit 220 infers the evaluation value of the operation state of the machine tool on the basis of the learning model read in step SB04 and the characteristic amount created in step SB03.

[Step SB08] The abnormality detection unit 400 detects an abnormality in the operation state of the machine tool on the basis of the evaluation value inferred in step SB05.

Figure 10:
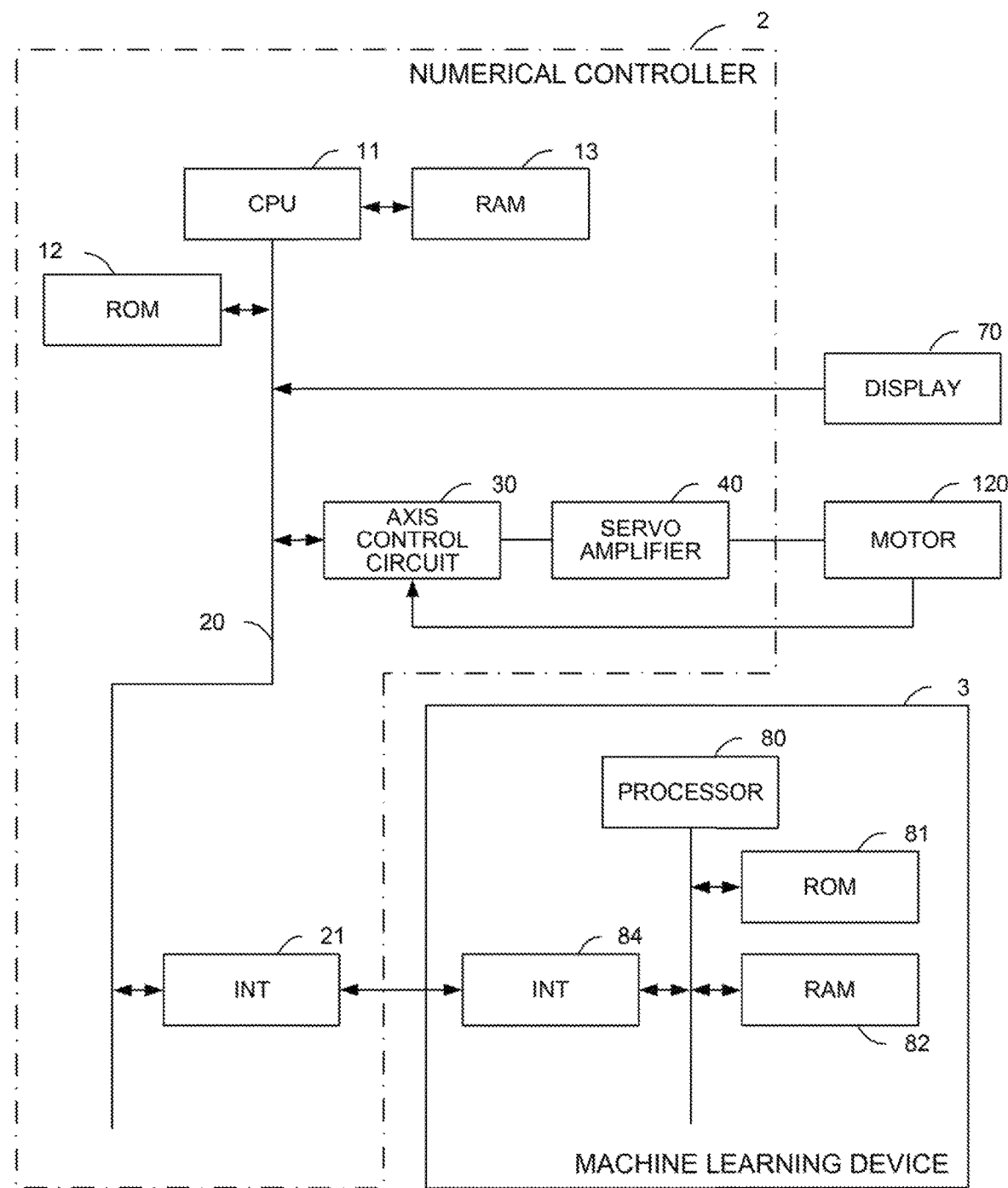
FIG. 10 is a schematic diagram illustrating a hardware configuration of main parts of a numerical controller and a machine learning device according to an embodiment of the present invention.

FIG. 10 is a diagram illustrating a schematic hardware configuration of main parts of a numerical controller and a machine learning device according to an embodiment of the present invention. A CPU 11 included in the numerical controller 2 of the present embodiment is a processor that controls the entire numerical controller 2. The CPU 11 reads a system program stored in a ROM 12 and controls the entire numerical controller 2 according to the system program. Temporary computation data, display data, various pieces of data input by an operator via an input unit (not illustrated), and the like are temporarily stored in a RAM 13.

A display 70 is formed of a liquid crystal device or the like. An inference evaluation value indicating a wear state of a tool and a history thereof may be displayed on the display 70. As an implementation form of a proposed system, final results can be obtained by various methods such as a threshold judgment method, a trend graph judgment method, and an abnormality detection method. Some of the processes in which the results are obtained are visualized, whereby results that match industrial intuition of an operator who is actually operating the machine tool in a production area can be provided.

An axis control circuit 30 for controlling an axis included in the machine tool receives an axis movement command amount from the CPU 11 and outputs the command to a servo amplifier 40. The servo amplifier 40 receives this command to drive the motor 120 that moves the axis included in the machine tool. The axis motor 120 has a position and speed detector and feeds position and speed feedback signals back to the axis control circuit 30 to perform position and speed feedback control. In the hardware configuration illustrated in FIG. 1, although one axis control circuit 30, one servo amplifier 40, and one motor 120 are provided, a number of elements corresponding to the number of axes provided in the machine tool serving as a control target are provided.

An interface 21 is an interface for connecting the numerical controller 2 and the machine learning device 3. The machine learning device 3 includes a processor 80 that controls the entire machine learning device 3, a ROM 81 that stores a system program, a learning model, and the like, and a RAM 82 for temporarily storing information and data used for respective processes related to machine learning. The machine learning device 3 exchanges various pieces of data with the numerical controller 2 via the interface 84 and the interface 21.

While embodiments of the present invention have been described, the present invention is not limited to the above-described embodiments but can be embodied in various forms by applying various changes thereto.

The invention claimed is:

1. A numerical control system that detects an abnormality in an operation state of a machine tool that machines a workpiece, the numerical control system comprising a processor configured to:
   output a condition of a machining operation of the machine tool;
   detect a state amount indicating an operation state of the machine tool;
   create a characteristic amount, including data that characterizes the operation state of the machine tool, from the detected state amount;
   infer an evaluation value of the operation state of the machine tool, from the state amount and the characteristic amount;
   detect an abnormality in the operation state of the machine tool on the basis of the evaluation value;
   generate and update a learning model by machine learning that uses the state amount and the characteristic amount; and
   store at least one learning model generated by the processor in correlation with a combination of the conditions output by the processor and a use condition including an inference process including the characteristic amount or a processing ability necessary for use of the learning model, wherein
   the processor computes the evaluation value of the operation state of the machine tool by selectively using at least one learning model among the stored learning models on the basis of the output condition of the machining operation and the detected state amount and characteristic amount of the inference process or the processing ability of the processor,
   wherein the evaluation value includes information indicating a classification of normal/abnormal of the operation state, a location of the abnormality, and a distance between a current operation state of the machine tool and operation states of the machine tool in a normal state.

2. The numerical control system according to claim 1, wherein
   the processor generates a new learning model by altering an existing stored learning model.

3. The numerical control system according to claim 1, wherein the processor encrypts and stores the generated or updated learning model and decrypts the encrypted learning model when the learning model is read by the processor.

4. A numerical control system that detects an abnormality in an operation state of a machine tool that machines a workpiece, the numerical control system comprising a processor configured to:
- output a condition of a machining operation of the machine tool;
- detect a state amount indicating an operation state of the machine tool;
- create a characteristic amount, including data that characterizes the operation state of the machine tool, from the detected state amount;
- infer an evaluation value of the operation state of the machine tool, from the state amount and the characteristic amount;
- detect an abnormality in the operation state of the machine tool on the basis of the evaluation value; and
- store at least one learning model which is correlated in advance with a combination of output conditions of the machining operation of the machine tool and a use condition including an inference process including the characteristic amount or a processing ability necessary for use of the learning model, wherein
- the processor computes the evaluation value of the operation state of the machine tool by selectively using the at least one stored learning model, on the basis of the output condition of the machining operation and the detected state amount and characteristic amount of the inference process or a processing ability of the processor,
- wherein the evaluation value includes information indicating a classification of normal/abnormal of the operation state, a location of the abnormality, and a distance between a current operation state of the machine tool and operation states of the machine tool in a normal state.

5. A method for detecting an abnormality in an operation state, the method comprising:
- outputting a condition of a machining operation of a machine tool that machines a workpiece;
- detecting a state amount indicating an operation state of the machine tool;
- creating a characteristic amount that characterizes the operation state of the machine tool from the state amount;
- inferring an evaluation value of the operation state of the machine tool from the state amount and the characteristic amount;
- detecting an abnormality in the operation state of the machine tool on the basis of the evaluation value; and
- generating and updating a learning model by machine learning that uses the state amount and the characteristic amount, wherein
- in the inferring, selecting a learning model to be used, on the basis of the output condition of the machining operation and the detected state amount and characteristic amount of an inference process or processing ability of the processor, among at least one learning model correlated in advance with a combination of conditions of the machining operation of the machine tool and the inference process or the processing ability, and using the selected learning model to compute the evaluation value of the operation state of the machine tool,
- wherein the evaluation value includes information indicating a classification of normal/abnormal of the operation state, a location of the abnormality, and a distance between a current operation state of the machine tool and operation states of the machine tool in a normal state.

6. A method for detecting an abnormality in an operation state, the method comprising:
- outputting a condition of a machining operation of a machine tool that machines a workpiece;
- detecting a state amount indicating an operation state of the machine tool;
- creating a characteristic amount that characterizes the operation state of the machine tool from the state amount;
- inferring an evaluation value of the operation state of the machine tool from the state amount and the characteristic amount; and
- detecting an abnormality in the operation state of the machine tool on the basis of the evaluation value, wherein
- in the inferring, a learning model to be used is selected, on the basis of the output condition of the machining operation and the detected state amount and characteristic amount of an inference process or processing ability of the processor, among at least one learning model correlated in advance with a combination of conditions of the machining operation of the machine tool and the inference process or the processing ability, and using the selected learning model to compute the evaluation value of the operation state of the machine tool,
- wherein the evaluation value includes information indicating a classification of normal/abnormal of the operation state, a location of the abnormality, and a distance between a current operation state of the machine tool and operation states of the machine tool in a normal state.

* * * * *